G. CONSTANTINESCO.
ROTARY MOTOR ACTUATED BY ALTERNATING FLUID CURRENTS.
APPLICATION FILED APR. 27, 1917.
1,334,291.
Patented Mar. 23, 1920.
7 SHEETS—SHEET 1.
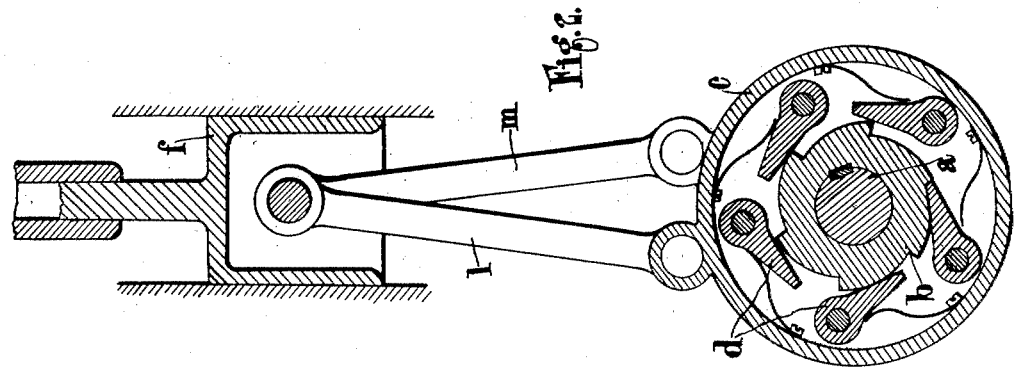
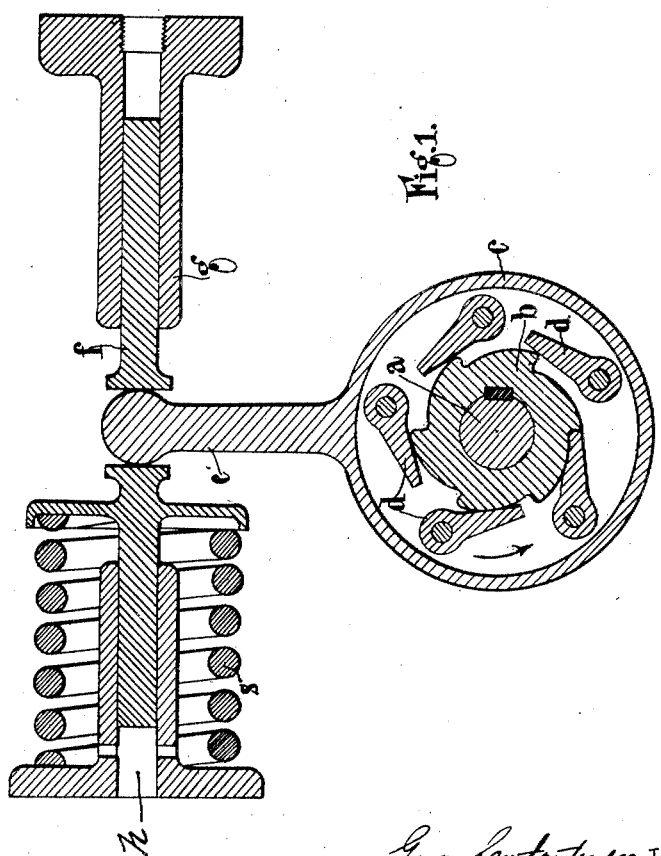

G. CONSTANTINESCO.
ROTARY MOTOR ACTUATED BY ALTERNATING FLUID CURRENTS.
APPLICATION FILED APR. 27, 1917.

1,334,291.

Patented Mar. 23, 1920.
7 SHEETS—SHEET 2.

Gogu Constantinesco Inventor
by Axel V Beeken
Attorney

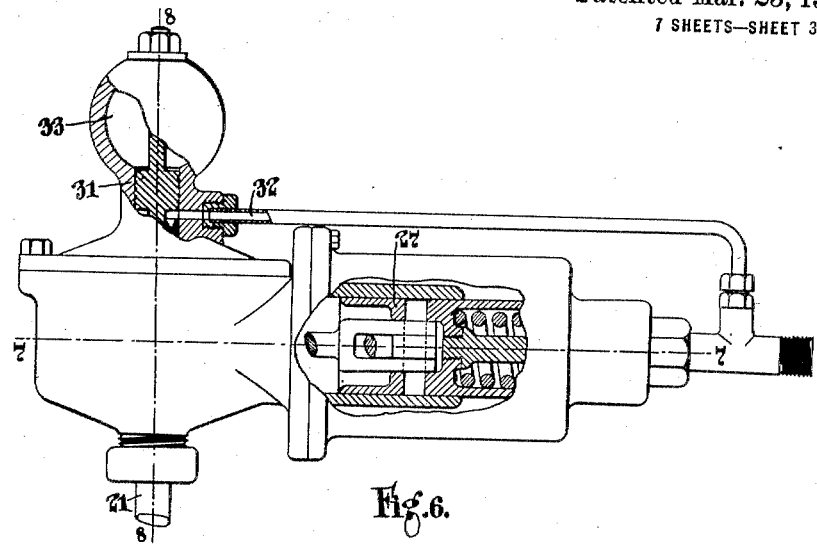
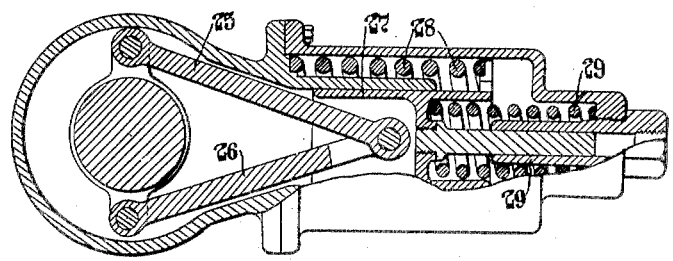
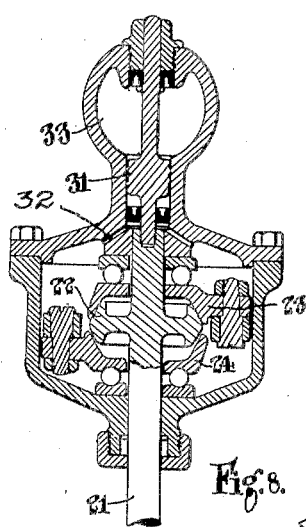

G. CONSTANTINESCO.
ROTARY MOTOR ACTUATED BY ALTERNATING FLUID CURRENTS.
APPLICATION FILED APR. 27, 1917.
1,334,291.
Patented Mar. 23, 1920.
7 SHEETS—SHEET 5.
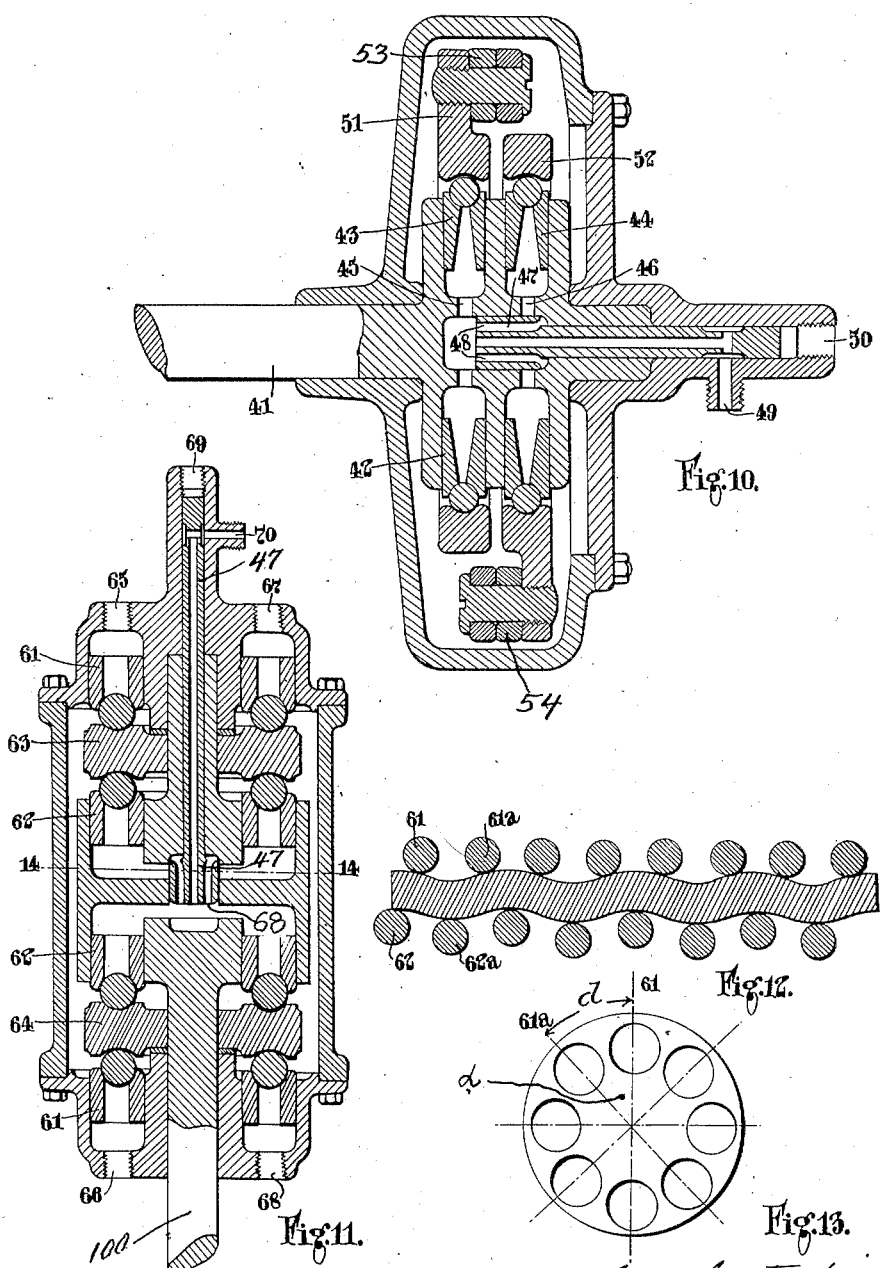

G. CONSTANTINESCO.
ROTARY MOTOR ACTUATED BY ALTERNATING FLUID CURRENTS.
APPLICATION FILED APR. 27, 1917.

1,334,291.

Patented Mar. 23, 1920.
7 SHEETS—SHEET 6.

G. CONSTANTINESCO.
ROTARY MOTOR ACTUATED BY ALTERNATING FLUID CURRENTS.
APPLICATION FILED APR. 27, 1917.

1,334,291.

Patented Mar. 23, 1920.
7 SHEETS—SHEET 7.

a # UNITED STATES PATENT OFFICE.

GOGU CONSTANTINESCO, OF ALPERTON, ENGLAND, ASSIGNOR OF ONE-HALF TO WALTER HADDON, OF LONDON, ENGLAND.

ROTARY MOTOR ACTUATED BY ALTERNATING FLUID-CURRENTS.

1,334,291.   Specification of Letters Patent.   Patented Mar. 23, 1920.

Application filed April 27, 1917. Serial No. 164,908.

*To all whom it may concern:*

Be it known that I, GOGU CONSTANTINESCO, a subject of the King of Great Britain and Ireland, residing at Westoe, Stanley avenue, Alperton, in the county of Middlesex, England, have invented certain new and useful Improvements in Rotary Motors Actuated by Alternating Fluid-Currents, of which the following is a specification.

The present invention relates to rotary motors intended to be actuated by alternating currents of fluid, especially motors actuated at a distance by liquid wave transmission.

The object of the invention is to obtain rotary motion of any desired speed from alternating impulses traveling in a monophase or two-phase liquid wave transmission line.

The invention consists in a rotary motor having one or more oscillating members actuated by alternating fluid currents driving a rotor in a constant direction by means of a suitable unidirectional drive.

The invention further consists in a rotary motor comprising a piston actuated by alternating periodic impulses in a liquid column and producing rotation of a rotor through a suitable ratchet device.

The invention also consists in causing the alternating current in a liquid wave transmission line to actuate clutch devices so that a reciprocating piston or pistons actuated by alternating current can drive the rotor in a constant direction during the forward and backward strokes of the driving piston or pistons.

The invention also consists in the constructions of rotary motor hereinafter described.

Referring to the accompanying drawings:—

Figure 1 is a section showing a simple form of a motor constructed according to the invention.

Fig. 2 shows a modification adapted to obtain a high angular velocity of the rotor and using two ratchets working in opposite directions.

Fig. 6 shows another type of machine according to the invention partly in section, while Fig. 7 is a section on the line 7—7, Fig. 6.

Fig. 8 is a section on the line 8—8, Fig. 6.

Fig. 10 is a section on the line 10—10, Fig. 9.

Fig. 11 is a section of a motor in which the stator and rotor pistons are parallel to the shaft.

Fig. 12 is a developed view showing the arrangement of the stator and rotor pistons.

Fig. 13 is a plan of the stator pistons.

Figure 3:
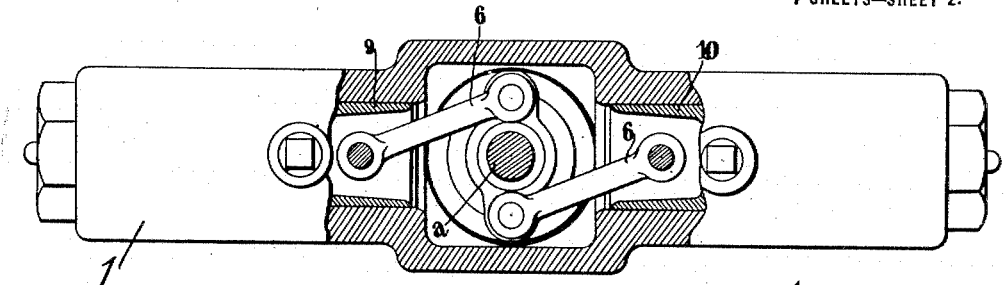
Fig. 3 shows a motor in which two ratchets are employed on the same shaft giving a driving impulse at each half period.

In the modification of the invention shown in Fig. 1, the shaft $a$ to be driven is keyed to the toothed wheel $b$ which has six teeth. Around this wheel and concentric with it is a drum $c$ carrying steel pawls $d$ pressed by suitable springs (not shown) against the toothed wheel. This drum is oscillated by an arm $e$ engaging with the piston $f$ working in a cylinder $g$ connected to a liquid wave transmission line.

The reciprocating piston at its lower end is guided in a cylinder $h$ and a spring $s$ acts on the reciprocating parts.

The spring $s$ should be of such strength that the piston is in equilibrium in the position illustrated under the action of the spring and the mean pressure in the wave transmission line. If the mass of the oscillating parts is considerable or the frequency of the alternating current is high, a second spring acting in the opposite direction should be provided. The size of these springs will depend on the stroke of the piston $f$, the frequency, the inertia of the reciprocating masses and the power which is required from the motor.

If the springs are calculated so that the natural time period of oscillation of the reciprocating masses is equal to the periodicity of the alternating current the maximum stroke will be obtained from the piston and consequently the maximum speed of the motor.

The operation of this motor is as follows:—

The piston $f$ under the impulse of the alternating fluid oscillates the arm $e$, producing an oscillation of the drum $c$ about its center. For a half period of the rotation in the direction of the arrow, one of the pawls $d$ engages one tooth of the rotor wheel $b$. During the next half period the drum is moving in the opposite direction and the pawls $d$ slide on the rotor and the next pawl drops behind the next tooth of the wheel $b$. The next forward stroke of the piston, therefore, rotates the motor through a further angle, and so on.

If a flywheel is fixed to the shaft $a$ the successive impulses given to the wheel by the pawls keep the flywheel rotating in the direction of the arrow, since all the impulses are in one direction. The small impulses in the reverse direction, due to the friction of the pawls on the rotor during the return movement is practically negligible and the flywheel will keep up a nearly uniform speed of rotation in one direction.

If desired, a safety ratchet may be provided on the shaft to prevent reverse rotation in the case in which no flywheel is used, and the load on the motor is of such a nature that it would give a recoil to the shaft thus not allowing time for the succeeding pawl to engage the next tooth of the rotor wheel.

If the number of teeth on the rotor wheel is $km$, the number of pawls equally distributed on the circumference should be $k(m-1)$ and with such an arrangement there will always be the $k$ teeth engaged at a time. In the example illustrated $k=1$ and $m=6$. The minimum angle of oscillation necessary to pass from one tooth to the next is $$\frac{2\pi}{k^2 m(m-1)}$$

In the case illustrated the angle would be $$\frac{2\pi}{6 \times 5} = \frac{\pi}{15}$$

It will be seen that if the rotor wheel had eleven teeth with ten pawls the angle would only be $\frac{\pi}{55}$ and it will be seen that an ordinary ratchet would require 110 teeth in order to obtain the same result.

In the form of the invention shown in Fig. 2, two drums $c$ and two connecting rods $l$, $m$, are employed one connecting rod and drum driving the shaft $a$ through the pawls $d$ and wheel $b$ on the forward stroke of the piston $f$ while the other connecting rod $m$ through a second drum and pawls drives the shaft $a$ in the same direction on the return stroke of the piston $f$.

Figure 4:
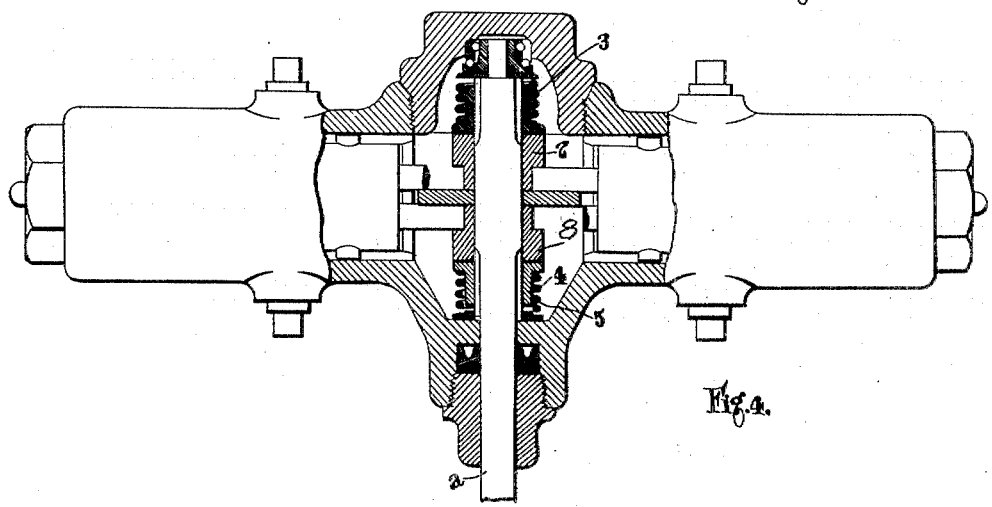
Fig. 4 is a view partly in section in a plane at right angles to the plane of the section, Fig. 3.
Figure 5:
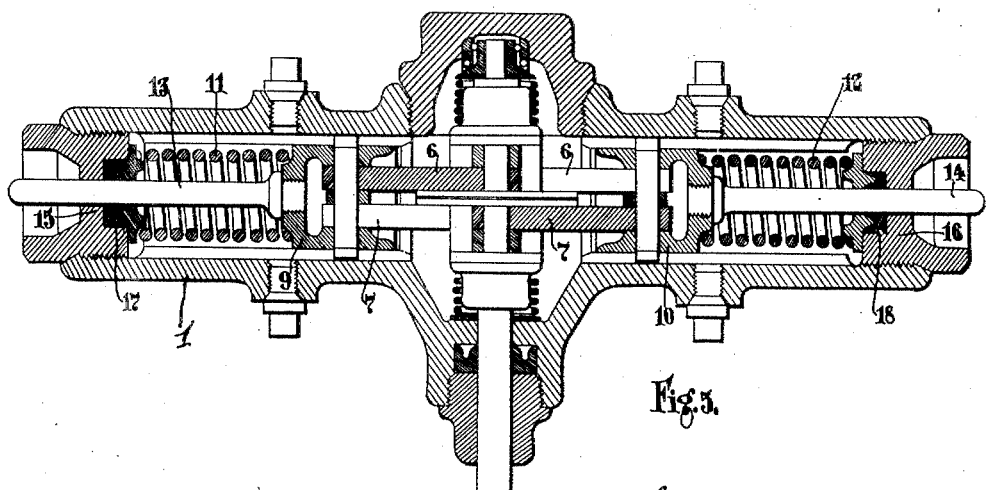
Fig. 5 is a complete section in the same plane as Fig. 4.

In the form of the invention shown in Figs. 3, 4 and 5, the driven shaft $a$ is mounted in a casing 1. Freely mounted on the shaft are two driving members consisting of sleeves 2, 8, with ratchet teeth on their end faces adapted to engage with ratchet teeth on two sleeves 3, 4 which are pressed inward by springs 5. The sleeves 3, 4, are keyed to but are capable of sliding along the driven shaft $a$. The clutch members 2, 8, are driven by connecting rods 66, 77, respectively, these connecting rods being joined to two guides 9, 10, which are pressed inward by springs 11, 12. The guides 9, 10, are driven by two equal pistons 13, 14, fitting closely in the bushes 15, 16. To prevent rotation of these guides suitable keys and slots are provided in the longitudinal direction. The springs 11, 12 are of strength to balance the mean pressure in the wave transmission line on which the motor works.

The operation of the motor is as follows:—

The wave transmission line is placed in communication with the interior of the casing and the liquid enters the casing and fills the whole of its interior. The guides 9, 10, are provided with apertures so that the liquid can pass into the whole of the interior of the casing up to the packings 17, 18. The pistons are thus pressed outward and under the mean pressure in the line should be balanced by the springs 11, 12.

The alternating current in the wave line will therefore cause the pistons, together with their guides 9, 10, to oscillate. The movement of the pistons through the connecting rod oscillates the clutch pieces 2, 8, and the faces of these clutch pieces engage with ratchet teeth on the sleeves 3, 4, the teeth being so inclined that the inward movement of the pistons causes a semi-oscillation of the shaft through one pair of clutch members, while the teeth of the other pair of clutch members slide over each other, while during the outward movement of the pistons for the next semi-oscillation of the shaft the other pair of clutch members effects the driving so that there is a continuous unidirectional drive of the shaft.

It will be seen that in this motor the oscillating parts move in opposite directions, and vibration, due to unbalanced inertia forces which arise if only one driving piston is used are avoided.

The motor illustrated can be usefully applied to a hand boring machine, the tool being attached to the shaft $a$. The motor described is suitable for a wave transmission line with a frequency of 24 alternations per second and the ratchets may conveniently be arranged to give a speed of rotation to the shaft of about 300 revolutions per minute.

The motor may be constructed for any desired power and speed and especially suitable for giving a lower speed of rotation than the synchronous speed of the generator of the wave transmission line.

In the form of the invention shown in Figs. 6, 7 and 8, the mechanical ratchet is replaced by a friction clutch actuated from the wave transmission line. The rotor shaft 21 carries a double coned member 22 adapted to be engaged by either of the two cone-shaped clutch members 23, 24. The clutch members 23, 24 are oscillated in their planes by connecting rods 25, 26, attached to a piston 27 which is actuated by the pressure in the wave transmission line, the piston 27 being supported in a mean position by the springs 28, 29, which should be of such strength that the piston in its mean position is in equilibrium under the action of the springs to the mean pressure in the line.

The shaft 21 is capable of sliding a short distance in a longitudinal direction and its movement in this direction is controlled by a double acting piston 31, the lower end of which through the passage 32 is directly connected to the wave transmission line while its upper face is subjected to the pressure existing in the chamber 33. The liquid passes into this chamber by leakage passed from the piston 31 with the result that the pressure in the chamber is practically constant and equal to the mean pressure in the wave transmission line.

It will be seen therefore that as the lower side of the piston is subjected to the full variations of pressure in the transmission line an oscillating motion will be given to the shaft 21. The effect of this is that when the shaft is pressed upward, that is, when there is an increase of pressure in the transmission line, the double conical piece 22 will engage with the clutch member 23. For increase in pressure in the wave line, therefore, the clutch member 23 being actuated by the piston 27 will drive the shaft. When the pressure in the transmission line is below the mean pressure, the pressure above the piston 31, being greater than the pressure in the line, will drive the shaft 21 downward, disengaging the member 22, from the member 23 and causing it to engage with the member 24. During this half period the pressure is decreasing the main piston moving away from the shaft 21.

It will thus be seen that the shaft 21 will be given a unidirectional drive, the clutch members being so arranged that during the movement of the piston 27 toward the shaft the driving is effected by the clutch member 23 while when the piston is moving away from the shaft the driving is effected by the clutch member 24.

It will be seen that many variations in the construction above described are possible; for instance instead of the chamber 33 a spring might be employed adjusted to press the shaft downward with a constant pressure equal to the mean pressure in the wave transmission line. A spring, however, would give rise to difficulty as it would require an absolutely constant mean pressure in the main line or an adjustment of the spring according to the pressure in the line.

If desired, instead of a chamber filled with liquid the piston moving the shaft longitudinally may be put into communication with a wave transmission line differing in phase by 180 degrees from that driving the main piston, and in this case the motor would operate in a similar manner to that above described.

If two lines are employed, the main piston also may be made double-acting, one side being connected to each phase of the transmission line. In this type of motor it is desirable that the oscillating parts should be kept light in order to avoid any appreciable variation of phase between the pressure in the wave transmission line and the angle of oscillation of the stator members. If the oscillating parts are heavy they should be balanced by two springs acting in opposite directions and calculated so as to form a condenser adapted to counteract the effects of inertia.

Figure 9:
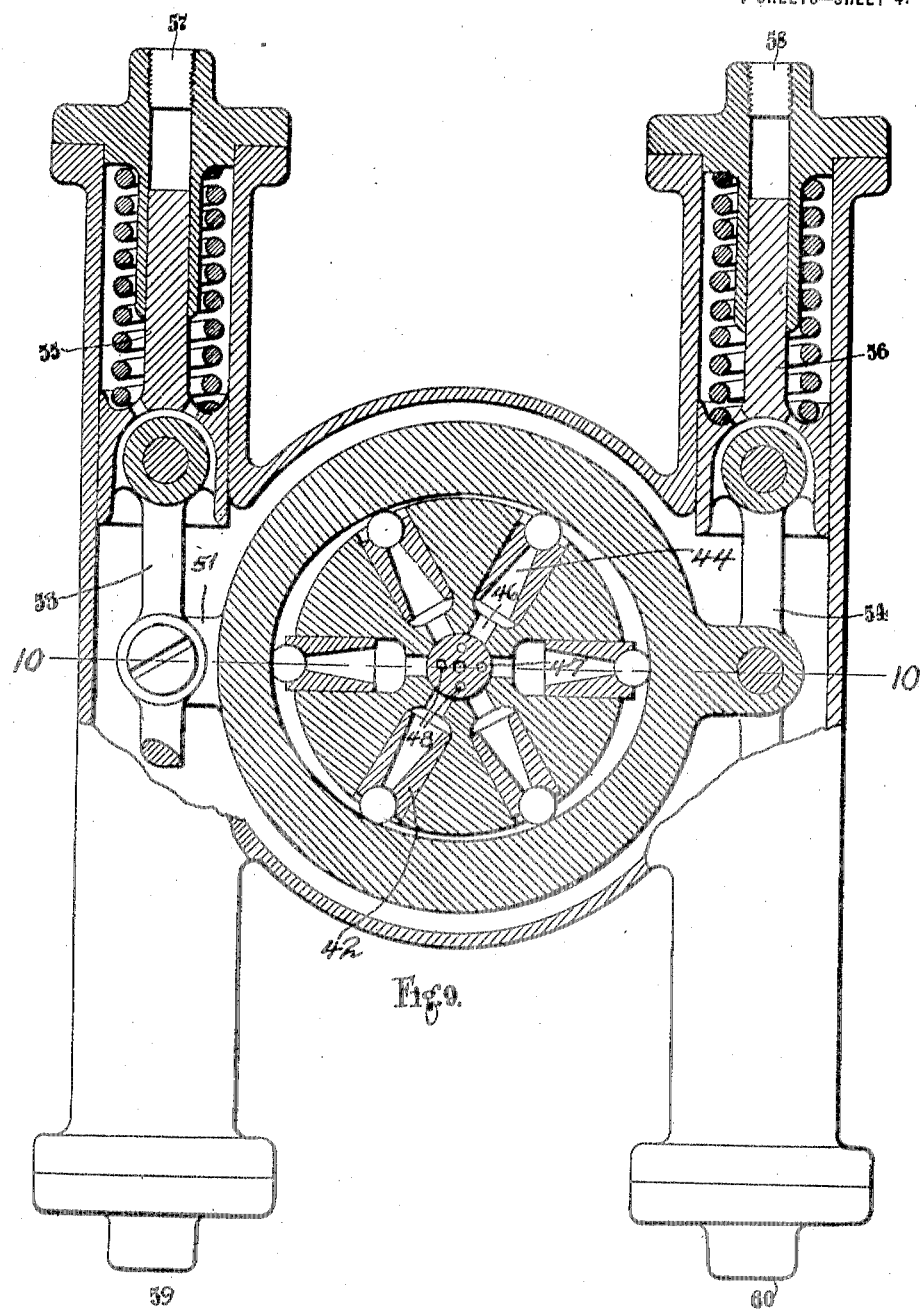
Fig. 9 is a view partly in section of a motor working on a two-phase line having clutches operated by the impulses in the transmission line.
Figure 14:
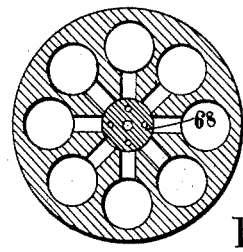
Fig. 14 is a section on the line 14—14, Fig. 11.

The simple clutch illustrated in Figs. 6, 7 and 8 is only suitable for comparatively small powers. For large machines driving heavy loads a hydraulic clutch is more suitable; for instance the rotor member may carry a number of pistons actuated by an eccentric or corrugated track carried by the driving member. The pistons pumping liquid among themselves through a special distributing valve are adapted to cut off the communication between one set of pistons during one half period and to open the communication between these pistons during the next half period. An example of motor of this type is illustrated at Figs. 9 and 10. In this motor the driven shaft 41 carries a block 42 in which work two sets of pistons 43, 44. These pistons work in cylinders uniformly distributed around the axis of the shaft and the two sets of pistons are in communication among themselves through apertures 45, 46 respectively. A piston 47 is provided capable of moving in the axial direction, this piston being provided with passages 48 by which liquid can pass to both sets of cylinders in the rotor. The piston is hollow and is supplied with liquid through the inlet 49. The inlet 49 is connected to a chamber filled with liquid or to one phase of a two-phase line while the other phase of the transmission line is connected to the inlet 50 so that the alternating pressure acts on the outer end of the piston 47.

It will be seen that with this construction the alternations in the wave line cause a reciprocation of the piston 47, so that during successive half periods each set of pistons in the rotor is put into communication while the other set is cut off from communication by the piston 47. Surrounding the pistons of the rotor are two eccentric or suitably shaped races 51, 52 connected with reciprocating members 53, 54, these members being reciprocated by pairs of pistons 55, 56, held in a mean position by means of springs and subjected at their two ends to alternating fluid currents from two transmission lines one transmission line being connected to the inlets 57, 58, while another is connected to the inlets 59, 60, the two wave lines differing in phase from each other by 180 degrees.

Instead of tracks of the form illustrated which may be called a two-pole track the track may be shaped with more poles, that is to say in such a manner that for one revolution of the rotor two or more impulses are given to the rotor pistons.

The operation of this motor is similar to those above described, the clutching of the oscillating member to the rotor being effected by the fluid pressure on the rotor pistons at the correct periods to produce continuous rotation in one direction.

It will be seen that this type of motor also is capable of considerable modification; for instance, a single group of pistons alone may be employed, but in this case the torque will not be so uniform; the rotor would be driven during half period only and if the load is such that it can recoil it may be necessary to use a heavy flywheel or ratchet device to prevent reversing of the rotor.

It will be seen that this type of motor may be built with pistons moving parallel to the rotor shaft, the operation being similar to that above described. In this manner very large motors may be built having any speed below the synchronous speed of the generator. If higher speeds are required multiplying gearing may be employed, but such motors would rarely be required and the method is more adapted for small powers.

In the form of the invention shown in Figs. 11, 12, 13 and 14, the stator pistons 61, and rotor pistons 62, work parallel to the rotor shaft 100. The oscillating members of the stator are actuated in the same manner as 51 and 52 of Fig. 10 and consists of disks 63, 64, capable of oscillation in their planes and having on their side faces corrugations, a developed view of which is shown at Fig. 12. There are two sets of stator pistons 61, 61ª, and two sets of rotor pistons 62, 62ª. The stator pistons are arranged in cylinders shown in plan at Fig. 13 and are arranged in two groups of four each as illustrated. The pistons of the group 61 are connected in parallel through pipe connections 65, 66, with one wave line, while the group 61ª are connected through pipe connections 67, 68, to a second wave line differing in phase from the first by 180 degrees, or are connected to a suitable chamber filled with liquid.

The corrugated track on the oscillating members 63, 64, is such that when an alternating pressure is applied to the two groups 61, 61ª, an angular oscillation of the members 63, 64, is produced whose amplitude is about equal to the angle $\frac{\alpha}{2}$ Fig. 13.

Similar tracks are provided on the rotor sides of the members 63, 64, and the pistons on this side are free or locked against rotation relatively to the track by the distributer piston 47 operating in a manner similar to that described with reference to Fig. 10.

The outlets 69, 70, are connected, like 50 and 49 of Fig. 10, to the two wave lines feeding the stator pistons or one of them, 70, may be connected to a chamber which may be the same as that used with one of the stator groups of pistons.

It will be seen that this type of motor may have any desired ratio speed to the periodicity of the wave line the reduction depending upon the angle α between the two groups of pistons, 61, 61ª.

For high speed machines these groups may be reduced to a single piston for a group, the corrugation being reduced to a simple inclined plane working as a swashplate. In this case the angular oscillation of the members 63, 64, is about 180 degrees and the speed of the rotor would be nearly the synchronous speed of the wave line.

Instead of using a distributer positively driven by the alternating pressures in the wave line, an automatically driven distributer may be used adapted to close communication between the rotor pistons on one group 62, and close the communication between the rotor pistons of the other group by the change of direction of oscillation of the stator members.

Other methods of operating the distributer may be employed, for example, the rotor may be formed as a simple rotating member carrying only the tracks for the piston, and the pistons may reciprocate in the stator oscillating members, and in such case each of the stator members may have an independent distributer operating by inertia, closing the passages between the cylinders in which the pistons work when the oscillation is in one direction, and opening these passages when the oscillation is in the opposite direction.

Figure 15:
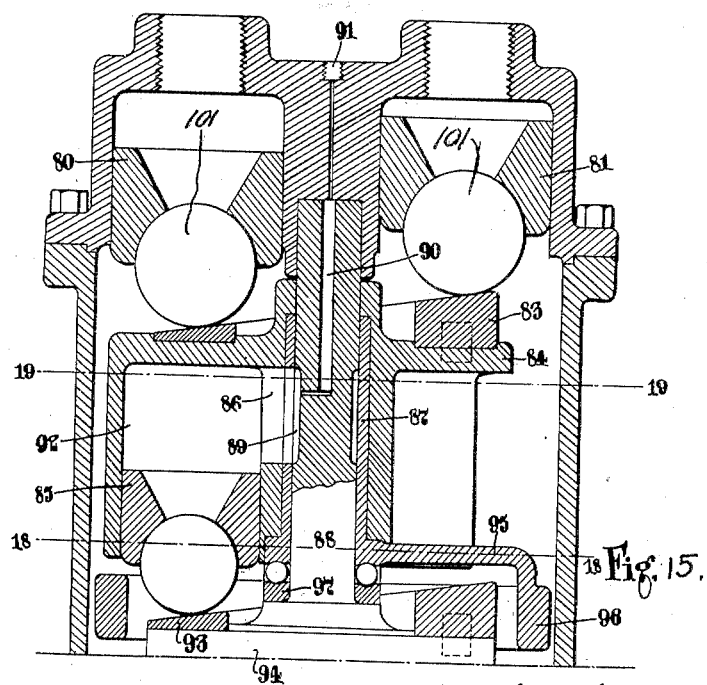
Fig. 15 shows a motor with a frictionally operated distributer.
Figure 16:
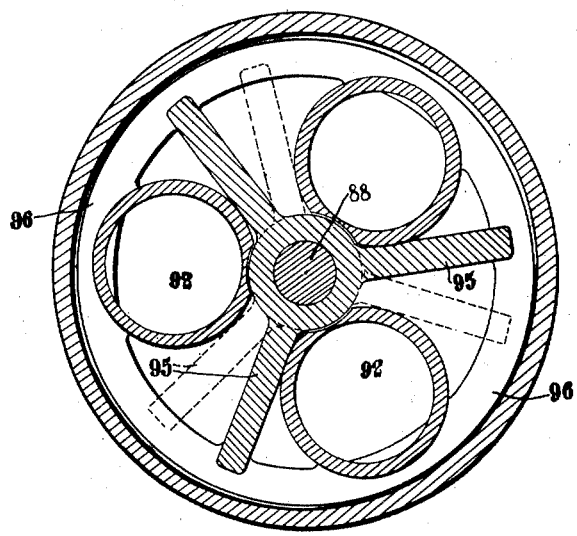
Fig. 16 is a section on the line 18—18, Fig. 15, with the pistons removed.
Figure 17:
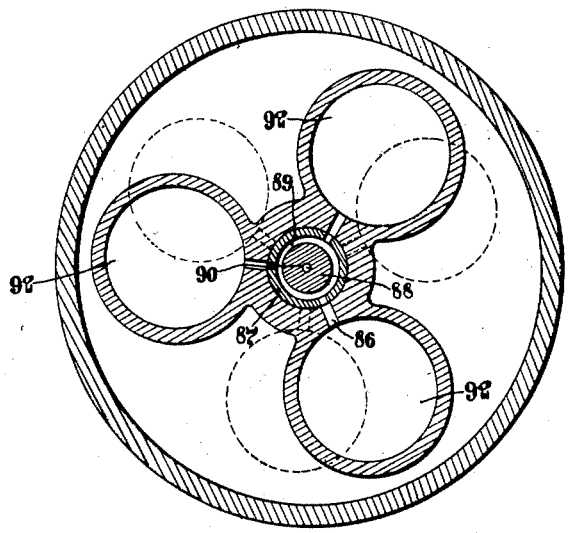
Fig. 17 is a section on the line 19—19, Fig. 15.

Instead of a distributer operated by inertia, a distributer operated by friction may be employed. A motor having such an inertia driven distributer is shown in Figs. 15, 16 and 17. The stator in this case includes two pairs of pistons 80, 81, only one pair being illustrated; the figure is cut off centrally, the lower half being exactly similar to the upper half. The pistons 80, 81, of the stator are not exactly diametrically situated, but are so placed that the two planes passing through the axis of the rotor and the axes of the two pistons are inclined to each other at an angle somewhat less than 180 degrees, say 170 degrees. The bolts 101 of pistons 80, 81, bear against a track 83, which consists of a simple inclined plane rigidly fixed to the stator oscillating member 84. This member carries three pistons 85, working in cylinders which communicate through narrow slots 86. This communication, however, can be periodically cut off by a rotating sleeve 87 fitting around the rotor shaft 88 and having slots corresponding with the slots 86. At one position of the sleeve relatively to the oscillating member 84 communication is allowed between the cylinders in which the pistons 85 work through the slots and the annular space 89. The small passage 90 is provided along the axis of the rotor shaft 88 and liquid under the mean pressure of the wave transmission line is admitted to this passage by the connection 91. To obtain this mean pressure, it is only necessary to connect the transmission line to the passage 90 by a pipe of very small bore whose friction is sufficiently great to prevent variation in the pressure of the liquid admitted to the cylinders 92. The cylinders are thus filled with liquid at the mean pressure of the wave transmission line.

The pistons 85 act on a track 93 on the rotor. This track consists merely of an inclined plane rigidly fixed to the rotor shaft on a flange 94. The sleeve 87 carries three brackets 95 which support a ring 96 forming a certain inertia against the angular oscillation of the sleeve.

The operation of this motor is as follows:—

The pistons 80, oscillating under the alternating impulses produce an angular oscillation of the stator member 84 with an amplitude approaching 180 degrees, in the case assumed the amplitude is 170 degrees. During this oscillation the cylinders 92 impinge against the brackets 95 of the sleeve 87 and the effect of the inertia of the ring 96 is to close and open alternately the passages 86. When the passages 86 are open during a half oscillation the pistons 85 are free to move in their cylinders and thus will simply roll over the track 93 without affecting the rotor. During the next half oscillation, however, the apertures 86 are closed and the pistons 85 are locked against the track 93 and thus cause the rotor to rotate during the half revolution.

As the machine is built symmetrically on its upper and lower halves, the stator pistons of the lower half being so placed that they oscillate their stator member in the opposite directions to that in which the stator member 84 of the upper half oscillates, the rotor shaft would be picked up by the lower stator member during the half period it is left free by the upper stator member. In this way the rotation is always in one direction, as in the previous modification.

The motor shown in Figs. 15, 16 and 17 rotates at nearly the synchronous speed. Any lower speed may be obtained by arranging the stator pistons at a smaller angle than 180 degrees and suitably shaping the track 83. The thrust bearing 97 illustrated is provided to take up the thrust coming from the mean pressure acting on the unbalanced area of the wall of the sleeve and the pressure due to leakage between the sleeve and shaft. If small holes are perforated in the member 84 above the sleeve the thrust bearing may be dispensed with.

Instead of providing an inertia ring 96, this may be made quite light and restrained by a constant frictional force in the nature of a light brake, sufficiently strong to insure relative rotational slip between the sleeve and the stator member.

What I claim is:—

1. A rotary motor comprising: means for receiving and utilizing an alternating fluid current including an oscillating member, a rotor, and unidirectional driving means driving said rotor in a constant direction from said oscillating member.

2. A rotary motor comprising: means for receiving and utilizing an alternating fluid current including an oscillating member, a rotor, a driving device for said rotor actuated by said oscillating member, a clutch interposed in said driving device, and means actuated by the alternating fluid current for operating the clutch.

3. A rotary motor comprising: means for receiving and utilizing an alternating fluid current including a pair of oscillating members, a rotor, and means for connecting said rotor alternately with each of said oscillating members to produce unidirectional rotation of said rotor.

4. A rotary motor comprising: means for receiving and utilizing an alternating fluid current including a pair of oscillating members, a rotor, and clutch means, actuated by said alternating fluid current, for connecting and disconnecting said rotor alternately with each of said oscillating members to produce unidirectional rotation of said rotor.

5. A rotary motor comprising: means for receiving and utilizing an alternating fluid current including a pair of oscillating members, a rotor, and clutch means for connecting and disconnecting said rotor alternately with each of said oscillating members to produce unidirectional rotation of said rotor, said clutch means including pistons actuated by said alternating fluid current and coöperating corrugated tracks on said oscillating members.

In testimony whereof I have signed my name to this specification.

GOGU CONSTANTINESCO.